L. G. HOWLETT & F. L. WILD.
TAPPING ATTACHMENT FOR DRILLING MACHINES.
APPLICATION FILED SEPT. 7, 1915.
1,185,323.
Patented May 30, 1916.
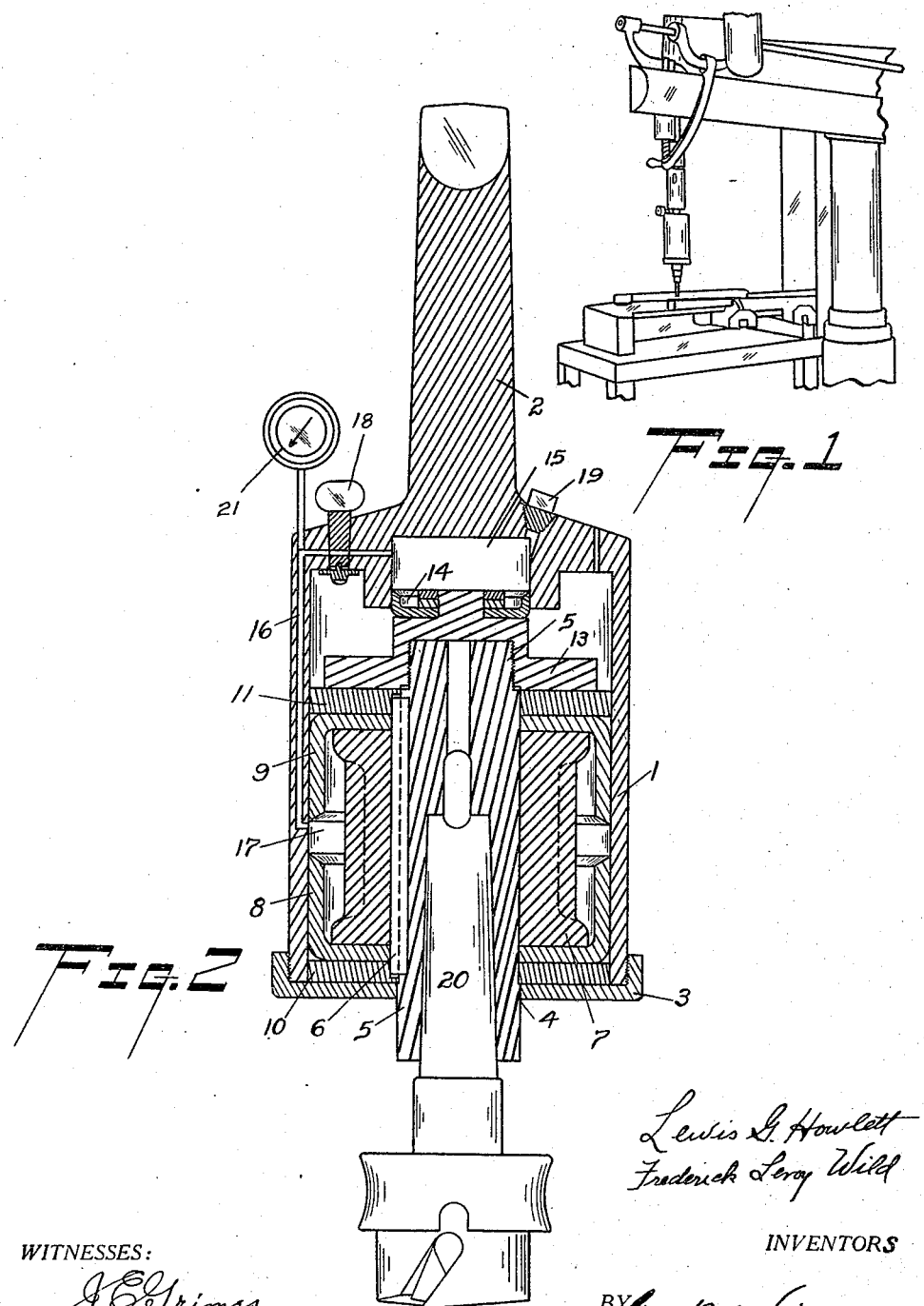

UNITED STATES PATENT OFFICE.

LEWIS G. HOWLETT AND FREDERICK LEROY WILD, OF BAY CITY, MICHIGAN.

TAPPING ATTACHMENT FOR DRILLING-MACHINES.

1,185,323.   Specification of Letters Patent.   Patented May 30, 1916.

Application filed September 7, 1915. Serial No. 49,285.

*To all whom it may concern:*

Be it known that we, LEWIS G. HOWLETT and FREDERICK LEROY WILD, citizens of the United States, both residing at Bay City, in the county of Bay and State of Michigan, have invented certain new and useful Improvements in Tapping Attachments for Drilling-Machines; and we do hereby declare the following to be a full, clear, and exact description of the invention, such as will enable others skilled in the art to which it appertains to make and use the same.

This invention is a tapping attachment and pertains more particularly to a tapping device adapted for use with drilling machines.

The device pertains more particularly to a tool adapted to be mounted on the spindle of a drilling machine to receive a drill, a tap, a stud or like tool and to operate the drill or the tap, or to set the stud, as the case may be, exercising a positive torque, but being capable of slipping when a certain predetermined maximum torque is attained, as when the drill or tap sticks, or when the stud has been screwed clear to the bottom.

A further object of our invention is to provide means for quickly and accurately setting the device for producing a predetermined torque; and means whereby the amount of torque can be quickly changed to suit different classes of work, or different materials to be worked.

Another object is to provide a friction device for producing a predetermined torque that will be simple in construction, durable and not likely to get out of order.

With these and certain other objects in view which will appear later in the specification, our invention consists in the devices described and claimed and the equivalents thereof.

In the drawings, Figure 1 is a perspective view of a radial drill press with our improved tapping device arranged for tapping holes in a casting. Fig. 2 is a vertical section through the tapping device.

As is clearly shown in the drawings, the attachment consists in a hollow cylindrical shell or body 1 provided with a shank 2, by which the attachment is mounted on the drill press spindle. The lower end of the shell is closed by a cap 3.

The cap is provided with a central opening 4, in which is slidably mounted a longitudinally movable spindle 5, which is capable of a limited lengthwise movement in and out of the shell.

Fixed to the spindle 5 by means of a key 6, or otherwise, is a spool or piston head 7, the ends of which are capped by expansible or cup leather packings 8 and 9, the flanges of which project toward each other, as shown in Fig. 2. The lower cup leather 8 is secured to the spindle 5 and to the head 7 by means of a metal washer 10, and the upper cup leather 9 is similarly fixed by a washer 11. The washers 10 and 11 may be secured to the spindle by shrinking.

The upper end of the spindle is threaded, as at 5, and upon the threaded end 12 is screwed a threaded cap 13.

To the upper surface of the cap is secured an inverted cup leather packing 14 adapted to travel up and down along the walls of a smaller recessed chamber 15 formed in the upper end of the shell 1. The chamber 15 communicates, by means of a passage 16, with the annular space 17, which surrounds the spool 7. The annular space is closed below and above by the flanges of the cup leathers 8 and 9. A suitable shut-off valve 18 controls the passage 16.

A filling plug 19 enables the chamber 15, passage 16 and the annular space 17 to be filled with oil or other suitable liquid.

The operation of the device is as follows: The tapping attachment, having been mounted in the spindle of a drill press by means of the shank 2, and the drill or other tool, or a stud having been mounted in the usual manner in the socket 20 of the spindle 5, the point of the drill is forced down upon the work, or upon any fixed object, by means of the tool-feed handle of the drill press, thereby forcing the shell 1 down with relation to the drill, to compress the oil in chamber 15, passage 16 and annular space 17. The increased pressure in the space 17 forces the flanges of the cup packing 8 and 9 outward against the walls of the shell 1. A suitable pressure gauge 21 communicating with the chamber 15 indicates the amount of pressure produced by the downward thrust of the shell with relation to the spindle 5. When the desired pressure is attained, valve 18 is closed, thereby maintaining a constant pressure of the oil in space 17 against the flanges of the packing and holding them tightly against the inner wall of the shell 1 to produce the frictional resistance required to transmit the proper amount of torque while the tool is being run into the work. If the tool sticks in the work to such an extent as to overcome the friction of the cup leathers against the wall of the shell the drill will stop and the shell will continue to revolve until the machine in which the device is being used can be stopped or reversed.

In setting down studs where it is desired to set them with a uniform pressure it is only necessary to adjust the oil pressure in the manner above described to produce the desired maximum torque, the proper amount of pressure for a given amount of torque being ascertained by trial.

By the means above described, we have produced a drilling attachment that interposes between the drilling machine spindle and the cutting tool a reliable friction-controlled device that can easily be adjusted to supply any given torque, various degrees of torque being obtainable almost instantly by increasing or decreasing the internal fluid pressure, and this is accomplished by merely pressing the point of the tool upon the work and then closing the valve 18 when the desired pressure is shown on the gage 21. The device is adapted for use in drilling and tapping, setting studs, screwing in tap bolts, tightening nuts and screwing together parts which must have a known and definite tension, and for various other uses.

By proper adjustment of the fluid pressure a definite torque is provided that prevents breaking the drills, taps, or other tools. The device is effective in preventing the breaking of a drill when it punches through a hole, such breakage being frequently caused by the springing of the drill press arm. In "bottom tapping" holes the tap may be run to the bottom of the hole and upon reaching it the friction flanges will slip until the operator has had time to reverse the machine and back the tap out.

The device is especially well adapted for rapidly setting studs that must be perfectly square with the work, thereby overcoming much of the difficulty which has been experienced in setting studs by hand, because of the necessity of straightening the studs after they are set. The use of the expansion flanges operating under liquid pressure insures precision of operation and uniform results.

The cup leathers being immersed in oil are almost indestructible and last indefinitely. Moreover, the uniformity of results is not dependent upon the condition of the cup leathers, whether new or worn, since the pressure indicated on the gage 21 or its equivalent is the controlling factor in determining the torque at which the clutch will slip.

Having thus described our invention, what we claim and desire to secure by Letters Patent is:

1. The combination of a shell formed with a shank, a spindle longitudinally movable within said shell, a piston head fixed to said spindle, outwardly expansible packings carried by said piston head near its ends said packings disposed to form an annular space between them, a chamber in said shell above said piston head, a conduit connecting said chamber with said annular space, a closure in said conduit; said chamber, annular space and conduit filled with liquid.

2. The combination of a shell formed with a shank, a spindle longitudinally movable within said shell, a piston head fixed to said spindle, outwardly expansible packings carried by said piston head near its ends said packings disposed to form an annular space between them, a chamber of smaller diameter than said piston formed in said shell, a piston fixed to said piston head, and fitting said chamber, a conduit connecting said chamber with said annular space, a closure in said conduit; said chamber, annular space and conduit filled with liquid.

3. The combination of a shell, a spindle longitudinally movable within said shell, and formed with a socket, a piston head fixed to said spindle, oppositely disposed cup packings secured to the ends of said piston head, the flanges of said packing turned toward each other and disposed to form an annular space between them, a chamber in said shell above said piston head, a piston in said chamber, a conduit connecting said chamber with said annular space, a valve in said conduit, said chamber, annular space and conduit filled with liquid.

4. The combination of a shell, a piston head longitudinally movable in said shell, a spindle fixed to said piston head, oppositely disposed expansible packings secured to the ends of said piston head and engaging the walls of the shell and disposed to form an annular space between them, a conduit connecting the interior of said shell above the piston head with said annular space, a closure in said conduit, and means whereby the said annular space, conduit, and the space above said piston head may be filled with fluid, for the purposes set forth.

In testimony whereof we affix our signatures in presence of two witnesses.

LEWIS G. HOWLETT.
FREDERICK LEROY WILD.

Witnesses:
M. J. RODGERS,
JAS. B. BROWN.